United States Patent [19]

Hunter et al.

[11] 3,966,986

[45] June 29, 1976

[54] METHOD FOR ENHANCING TEA FLAVOR AND PRODUCT THEREOF

[75] Inventors: George L. K. Hunter, Atlanta, Ga.; Victor Krampl, Essen, Germany; Charles Thomas Malone, Doraville, Ga.; Gerald Edward Usher, Reading, England

[73] Assignee: Tenco Brooke Bond Limited, London, England

[22] Filed: Oct. 29, 1974

[21] Appl. No.: 518,305

Related U.S. Application Data

[63] Continuation-in-part of Ser. No. 327,056, Jan. 26, 1973, abandoned, which is a continuation-in-part of Ser. No. 71,411, Sept. 11, 1970, abandoned.

[52] U.S. Cl. ............................ 426/534; 426/536; 426/538; 426/597;
[51] Int. Cl.² ........................... A23F3/00; A23L1/22
[58] Field of Search ............ 426/597, 534, 536, 538, 426/650, 651, 386, 387

[56] References Cited
UNITED STATES PATENTS

| | | | |
|---|---|---|---|
| 1,696,419 | 12/1928 | Staudinger | 426/535 X |
| 2,137,374 | 11/1938 | Wright | 426/597 |
| 2,278,474 | 4/1942 | Musher | 426/597 |
| 2,476,072 | 7/1949 | Tressler | 426/597 |
| 3,477,854 | 11/1969 | Vautaz et al. | 426/597 |
| 3,634,098 | 1/1972 | Rhoades et al. | 426/534 |
| 3,634,101 | 1/1972 | Rhoades et al. | 426/534 |
| 3,645,755 | 2/1972 | Sakato et al. | 426/534 |
| 3,676,156 | 7/1972 | Bentz | 426/534 |
| 3,689,278 | 9/1972 | Carbonell | 426/597 |
| 3,702,253 | 11/1972 | Winter et al. | 426/535 X |

FOREIGN PATENTS OR APPLICATIONS

| | | | |
|---|---|---|---|
| 1,306,017 | 2/1973 | United Kingdom | 426/597 |

OTHER PUBLICATIONS

Agr. Biol. Chem. vol. 32 No. 3, pp. 379–386, 1968., Yamanishi et al.
Chemistry of Tea & Tea Manufacture, Stahl, pp. 228–231.
J. Agr. Food Chem., pp. 36–47, Bondarovich et al.

*Primary Examiner*—Steven L. Weinstein
*Attorney, Agent, or Firm*—Robert A. Lester; John R. Martin; W. Dexter Brooks

[57] ABSTRACT

A method for enhancing the flavor and aroma of a final tea beverage prepared from a soluble tea, e.g., a concentrated tea extract or a dried soluble tea, by adding a flavoring agent to the soluble tea to produce a final tea beverage containing about 0.01-25 ppm of the added flavoring agent. The flavoring agent, having different preferred compositions for cold and hot-water soluble products, includes up to 39 selected flavoring constituents in specified amounts.

74 Claims, No Drawings

METHOD FOR ENHANCING TEA FLAVOR AND PRODUCT THEREOF

CROSS-REFERENCES TO RELATED APPLICATIONS

This application is a continuation-in-part of U.S. pat. appl'n Ser. No. 327,056 filed Jan. 26, 1973, now abandoned, which in turn is a continuation-in-part of U.S. pat. appl'n Ser. No. 71,411 filed Sept. 11, 1970, now abandoned.

BACKGROUND OF THE INVENTION

This invention relates, generally, to tea flavor enhancement and, in particular, to the addition of flavoring substances to soluble tea in an amount and composition for achieving the flavor and aroma of fresh tea in a finally-reconstituted tea product.

There are presently available a wide variety of tea products that are sold commercially, for example green tea, black tea, soluble tea compositions and liquid teas.

Green tea is categorized as including freshly-gathered tea leaves, tea leaves that have been freshly-gathered and dried immediately, tea leaves that have been heat treated before drying, and aqueous extracts of these tea leaves. In each instance, the green tea has undergone substantially no fermentation to the black state.

Black tea, on the other hand, is generally made from green tea leaves by subjecting the leaves to a series of processing conditions including (1) withering, (2) rolling or otherwise breaking up the cells to initiate enzymic activity, (3) fermenting, and (4) firing. Rolling or otherwise breaking up the cells initiates the enzymic reaction of fermentation during which the character, color, flavor and aroma of black tea are developed. When the fermentation has progressed sufficiently, it is arrested by firing the tea leaves (i.e. drying) and the resulting product possesses the characteristic appearance, flavor, color and aroma of black tea.

Instant or soluble tea compositions, generally classified as either cold or hot-water soluble teas, are customarily prepared from the black tea leaves by extracting them either before or after they are dried. The extract (a) is then concentrated (b) may be dried if so desired and (c) otherwise processed according to well-known methods to produce cold and/or hot-water soluble teas.

It is well recognized in the beverage field that the flavor and aroma of tea beverages reside primarily in their volatile components. Accordingly, conventional soluble tea products, while commercially acceptable, leave much to be desired since very substantial amounts of these volatile components are lost during the processing operation necessary to convert the leaf tea of commerce into soluble tea products. These losses of volatiles occur at various processing stages, but in particular during (a) the step of concentration of the dilute extract, and (b) the subsequent step of drying the concentrated extract. Even though some of the volatile components which are removed with the water during the concentration step above can be recovered such as by partial condensation or by other processes known to those skilled in the art, and thus can be reincorporated into the concentrated extracts prior to drying, the relative proportions of key volatile and aroma components are inevitably altered under commercial processing conditions and the flavor and aroma of the resulting extract is not very satisfactory. Another problem is encountered during the drying operation mentioned above since here again key volatile and aroma components are either lost or altered. Necessarily, the losses suffered by each of the components differs depending upon processing conditions, i.e., spray drying, freeze drying, percent solids in the extract, etc.

SUMMARY OF THE INVENTION

The present invention provides a method for enhancing the flavor and aroma of a final tea beverage prepared from a soluble tea which comprises adding an amount of flavoring agent to the soluble tea sufficient to produce a final tea beverage having therein an added flavoring agent in a flavor-enhancing amount, preferably about 0.01–25 ppm, most preferably about 0.1–5 ppm; said flavoring agent consisting essentially of about 5–68% of at least one compound selected from the group consisting of linalool and linalool oxide, preferably about 3–56% linalool and about 2–16% linalool oxide, about 0–15% trans-2-hexenal, about 0–11% 1-penten-3-ol, about 0–8% trans-2-hexen-1-ol, about 2–16% cis-3-hexen-1-ol, about 0–21% iso-butanal, about 0–25% 2-methylbutanal, about 0–17% propanal, about 0–10% pentanal, about 0–6% hexanal, about 0–46% acetaldehyde, about 0–16% phenylacetaldehyde, about 0–5% methyl salicylate, about 0–4% (preferably at least about 0.7%) n-hexanol, about 0–2% ethyl acetate, about 0–0.6% alpha-terpineol, about 0–0.6% nerolidol, about 0–0.3% beta-ionone, about 0–0.3% iso-jasmone, about 0–0.7% benzaldehyde, about 0–2% n-pentanol, about 0–1% n-octanol, about 0–0.7% geraniol, about 0–3% iso-butanol, about 0–0.3% iso-propanol, about 0–8% n-butanol, about 0–1% phenylethanol, about 0–5% propionic acid, about 0–1 % iso-butyric acid, about 0–1.2% n-butyric acid, about 0–4% iso-valeric acid, about 0–4% n-valeric acid, about 0–0.6% 2-methylvaleric acid, about 0–0.06% iso-hexanoic acid, about 0–19% n-hexanoic acid, about 0–10% cis-3-hexanoic acid, about 0–10% trans-2-hexanoic acid and about 0–4% cis-2-penten-1-ol.

Suitably, said flavoring agent consists essentially of about 5–68% of at least one compound selected from a group consisting of linalool and linalool oxide, preferably about 3–56% linalool and about 2–16% linalool oxide, about 0–15% trans-2-hexenal, about 1–11% 1-penten-3-ol, about 0–8% trans-2-hexen-1-ol, about 2–16% cis-3-hexen-1-ol, about 0–21% iso-butanal, about 0–25% 2-methylbutanal, about 0–17% propanal, about 0–10% pentanal, about 0–6% hexanal, about 0–46% acetaldehyde, about 0–16% phenylacetaldehyde, about 0–5% methyl salicylate, about 0–4% n-hexanol, about 0–2% ethyl acetate, about 0–0.6% alpha-terpineol, about 0–0.6% nerolidol, about 0–0.3% beta-ionone, about 0–0.3% iso-jasmone, about 0–0.4% benzaldehyde, about 0–2% n-pentanol, about 0–1% n-octanol, about 0.4–0.7% geraniol, about 0–3% iso-butanol, about 0–0.3% iso-propanol, about 0–1% n-butanol and about 0–1% phenylethanol.

In one preferred embodiment said soluble tea is a coldwater soluble tea and said flavoring agent consists essentially of about 18–27% linalool, about 10–16% linalool oxide, about 7–15% trans-2-hexenal, about 4–8% 1-penten-3-ol, about 2–4% trans-2-hexen-1-ol, about 5–9% cis-3-hexen-1-ol, about 1–4% isobutanal, about 1–5% 2-methylbutanal, about 1–3% propanal, about 6–10% pentanal, about 1–3% hexanal, about 8–17% acetaldehyde, about ½–1.2% phenylacetaldehyde, about 1–4% methyl salicylate, about 2–4% n-hexenol, about 0.2–2% ethyl acetate, about 0.4–0.6% (or about ½%) alpha-terpineol, about 0.3–0.6% (or about ½%) nerolidol, about 0.1–0.3% (or about 0.2%) beta-ionone and about 0.1–0.3% (or about 0.2%) iso-jasmone. Optionally, the cold-water soluble tea flavoring agent may consist essentially of about 29–43% of at least one member selected from the group consisting of linalool and linalool oxide and the balance of the recited constituents.

Another preferred embodiment specified that said soluble tea is a hot-water soluble tea and said flavoring agent consists essentially of about 5–68% of at least one member selected from the group consisting of linalool and linalool oxide, preferably about 3–56% linalool and about 2–12% linalool oxide, about 0–7% trans-2-hexenal, about 0–11% 1-penten-3-ol, about 0–8% trans-2-hexen-1-ol, about 2–16% cis-3-hexen-1-ol, about 0–21% iso-butanal, about 0–25% 2-methylbutanal, about 0–17% propanal, about 0–7% pentanal, about 0–6% hexanal, about 0–46% acetaldehyde, about 0–16% phenylacetaldehyde, about 0–5% methyl salicylate, about 0.7–1 ½% (or about 1%) n-hexanol, about 0–0.03% beta-ionone, about 0–0.05% iso-jasmone, about 0–0.7% benzaldehyde, about 0–2% n-pentanol, about 0–1% n-octanol, about 0–0.7% geraniol, about 0–3% iso-butanol, about 0–0.3% iso-propanol, about 0–8% n-butanol, about 0–1% phenylethanol, about 0–5% propionic acid, about 0–1% iso-butyric acid, about 0–1.2% n-butyric acid, about 0–4% isovaleric acid, about 0–4% n-valeric acid, about 0–0.6% 2-methylvaleric acid, about 0–0.06% iso-hexanoic acid, about 0–19% n-hexanoic acid, about 0–10% cis-3-hexanoic acid, about 0–10% trans-2-hexanoic acid and about 0–4% cis-2-penten-1-ol.

A preferred hot-water soluble tea flavoring agent consists essentially of about 5–68% of at least one member selected from the group consisting of linalool and linalool oxide, preferably 3–56% linalool and about 2–12% linalool oxide, about 0–7% trans-2-hexenal, about 1–11% 1-penten-3-ol, about 0–8% trans-2-hexen-1-ol, about 2–16% cis-3-hexen-1-ol, about 0–21% iso-butanal, about 0–25% 2-methylbutanal, about 0–17% propanal, about 0–7% pentanal, about 0–6% hexanal, about 0–46% acetaldehyde, about 0–16% phenyl-acetaldehyde, about 0–5% methyl salicylate, about 0.7–1 ½% (or about 1%) n-hexanol, about 0–0.03% beta-ionone, about 0–0.05% iso-jasmone, about 0–0.4% benzaldehyde, about 0–2% n-pentanol, about 0–1% n-octanol, about 0.4–0.7% (or about ½%) geraniol, about 0–3% iso-butanol, about 0–0.3% iso-propanol, about 0–1% n-butanol and about 0–1% phenylethanol. More preferably, said flavoring agent consists essentially of about 3–13% linalool, about 2–3% (or about 2%) linalool oxide, about 3–7% (or about 5%) trans-2-hexenal, about 1–3% (or about 2%) 1-penten-3-ol, about 0.7–8% trans-2-hexen-1-ol, about 2–5% cis-3-hexen-1-ol, about 3–21% iso-butanal, about 5–25% 2-methylbutanal, about 0–17% propanal, about 3–7% pentanal, about 0.9–6% (or about 1–6%) hexanal, about 6–46% acetaldehyde, about 1–16% phenyl-acetaldehyde, about 0–2% methyl salicylate, about 0.7–1 ½% (or about 1%) n-hexanol, about 0–0.03% beta-ionone, about 0–0.5% iso-jasmone, about 0–0.4% benzaldehyde, about 0.09–2% (or about 0.1–2%) n-pentanol, about 0.02–1% n-octanol, about 0.4–0.7% (or about ½%) geraniol, about 0–3% iso-butanol, about 0–0.3% iso-propanol, about 0–1% n-butanol and about 0–1% phenylethanol.

Another preferred hot-water soluble tea flavoring agent consists essentially of about 56% linalool, about 12% linalool oxide, about 11% trans-2-hexen-1-ol, about 15% iso-butanal, about 5% methyl salicylate, about 1% n-hexanol and about ½% geraniol.

A further hot-water soluble tea flavoring agent consists essentially of about 11% linalool, about 5% linalool oxide, about 2% trans-2-hexen-1-ol, about 6% cis-3-hexen-1-ol, about 5% hexanal, about 3% phenylacetaldehyde, about 3% methyl salicylate, about 0.8% n-hexanol, about 0.7% benzaldehyde, about 2% n-pentanol, about 8% n-butanol, about 5% propionic acid, about 0.8% iso-butyric acid, about 1% n-butyric acid, about 4% iso-valeric acid, about 4% n-valeric acid, about 0.6% 2-methylvaleric acid, about 0.06% iso-hexanoic acid, about 19% n-hexanoic acid, about 10% cis-3-hexenoic acid, about 10% trans-2-hexenoic acid and about 3% cis-2-penten-1-ol.

Another aspect of the invention is concerned with a final beverage prepared by the above method.

The present invention is also directed to a flavoring agent, per se, consisting essentially of the described constituencies.

Finally, the present invention is concerned with a soluble tea prepared according to recited method.

These and other features of the invention along with their incident advantages will be better understood and appreciated from the following detailed description of various embodiments thereof.

DETAILED DESCRIPTION OF THE INVENTION

It has now been found that flavor and aroma inherent in freshly brewed tea can be imparted to either hot or cold-water soluble tea products by the addition of certain selected chemical substances (flavoring agents) to the soluble tea either before, after or during processing. Further, it has been discovered that a fresh tea flavor and aroma can be imparted to soluble tea products without the replacement of all or nearly all of the chemicals that have been found and reported in the composition of tea volatiles. See, for example, Tei Yamanshi, *TEA AROMA*, Eiyo To Sho, Vol. 21, 4, 227–235, 1968 and Bondarovich et al, *Some Aspects of the Chemistry of Tea, A Contribution to the Knowledge of the Volatile Constituents*, Journal of Agricultural and Food Chemistry, January-February, 1967, Vol. 15, pp. 36–47. In fact, such a fresh tea flavor and aroma can be imparted without replacing chemicals that have been reported to be important to fresh tea aroma and flavor. See, for example, Saijo, *Volatile Flavor of Black Tea, Part II, Examination of the First Fraction of Effluents in Gas Chromatography*, Agr. Biol. Chem., Vol. 31, No. 11, pp. 1265–1269, (1967) and Ina and Sakato, Tetrahedron Letters No. 23, 2777 (1968).

According to the broadest aspects of the present invention there is provided a method for enhancing the flavor and aroma of a final black tea beverage by adding a predetermined amount of a flavoring agent to a soluble tea so as to produce a final tea beverage having a flavor enhancing quantity of an added flavoring agent preferably about 0.01–25 ppm (most preferably 0.1–5 ppm) consisting essentially of about 5–68% of at least one of linalool and linalool oxide, (preferably about 3–56% and 2–16%, respectively), about 0–15% trans-2-hexenal, about 0–11% (preferably at least about 1%) 1-penten-3-ol, about 0–8% trans-2-hexen-1-ol, about 2–16% cis-3-hexen-1-ol, about 0–21% iso-butanal, about 0–25% 2-methylbutanal, about 0–17% propanal, about 0–10% pentanal, about 0–6% hexanal, about 0–46% acetaldehyde, about 0–16% phenyl-acetaldehyde, about 0–5% methyl salicylate, about 0–4% (preferably at least about 0.7%) n-hexanal, about 0–2% ethyl acetate, about 0–0.6% alpha-terpineol, about 0–0.6% nerolidol, about 0–0.3% beta-ionone, about 0–0.3% iso-jasmone, about 0–0.7% (preferably less than about 0.4%) benzaldehyde, about 0–2% n-pentanol, about 0–1% n-octanol, about 0–0.7% (preferably at least about 0.4%) geraniol, about 0–3% iso-butanol, about 0–0.3% iso-propanol, about 0–8% (preferably less than about 1%) n-butanol, about 0–1% phenylethanol, about 0–5% propionic acid, about 0–1% iso-butyric acid, about 0–1.2% n-butyric acid, about 0–4% iso-valeric acid, about 0–4% n-valeric acid, about 0–0.6% 2-methylvaleric acid, about 0–0.06% iso-hexanoic acid, about 0–19% n-hexanoic acid, about 0–10% cis-3-hexenoic acid, about 0–10% trans-2-hexenoic acid and about 0–4% cis-2-penten-1-ol.

It has been discovered that these relatively few chemicals can be added to a tea concentrate in sufficient quantities so as to allow for losses during subsequent processing steps such as the drying thereof. Accordingly, a finished product (product at normal drinking strength ready for human consumption) can be prepared that will contain the desired amount and ratio of flavoring components and exhibit a fresh tea flavor and aroma.

The particular composition and amount of flavoring agent added is dependent upon the extent of volatiles lost during processing, the type of tea flavor and aroma desired after processing and the type of tea being processed. The ranges of constituents listed not only permit a variable compensation for losses of natural tea components but allow for the introduction of various subtle nuances. A most important factor is whether the tea is to be hot or cold-water soluble.

The flavor and aroma resulting from any particular flavoring composition will necessarily vary depending upon the temperature of the final tea beverage. Thus, to compensate for variances between cold and hot-water products, a wide latitude of composition must be expected. For a high boiling material an increase in temperature has a greater impact on the rate of vaporization than for one of a low boiling point. Accordingly, it is usually preferable for a hot-water product as compared with a cold-water product, to have a greater concentrations of high boiling components and lower concentrations of low boiling point components. However, this preference may not prevail where different nuances are desired.

The primary, but not the only essential, flavoring constituents of the present invention have been found to be linalool and linalool oxide. Depending upon desired flavor and aroma objectives, these two ingredients may constitute a major portion of the flavoring agent. Although substantially interchangeable, a most preferred tea beverage results from a flavoring agent including about 3–56% linalool and about 2–16% linalool oxide.

A wide range of acetaldehyde is also generally permissible in view of its volatility, acetaldehyde being a gas under ambient conditions. A high concentration of acetaldehyde serves to compensate for losses in processing, particularly in connection with a hot-water soluble product. For the latter, acetaldehyde may serve as an important aroma constituent.

For a cold-water soluble tea, the flavoring agent most suitably consists essentially of about 18–27% linalool, about 10–16% linalool oxide, about 7–15% trans-2-hexenal, about 4–8% 1-penten-3-ol, about 2–4% trans-2-hexen-1-ol, about 5–9% cis-3-hexen-1-ol, about 1–4% iso-butanal, about 1–5% 2-methylbutanal, about 1–3% propanal, about 8–17% acetaldehyde, about ½–1.2% phenylacetaldehyde, about 1–4% methyl salicylate, about 2–4% n-hexanol, about 0.2–2% ethyl acetate, about 0.4–0.6% (or about ½%) alpha-terpineol, about 0.3–0.6% (or about ½%) nerolidol, about 0.1–0.3% (or about 0.2%) beta-ionone and about 0.1–0.3% (or about 0.2%) iso-jasmone. Bearing in mind the interchangeability of linalool and linalool oxide, the flavoring agent safely may optionally include between about 29–43% of one or both groups.

In the case of a hot-water soluble tea, the flavoring agent advantageously consists essentially of about 5–68% of at least one of linalool and linalool oxide (preferably about 3–56% and about 2–12% respectively), about 0–7% trans-2-hexenal, about 0–11% (preferably at least about 1%) 1-penten-3-ol, about 0–8% trans-2-hexen-1-ol, about 2–16% cis-3-hexen-1-ol, about 0–21% iso-butanal, about 0–25% 2-methylbutanal, about 0–17% propanal, about 0–7% pentanal, about 0–6% hexanal, about 0–46% acetaldehyde, about 0–16% phenylacetaldehyde, about 0–5% methyl salicylate, about 0.7–1 ½% (or about 1%) n-hexanol, about 0–0.03% beta-ionone, about 0–0.05% iso-jasmone, about 0–0.7% (preferably less than about 0.4%) benzaldehyde, about 0–2% n-pentanol, about 0–1% n-octanol, about 0–0.7% (preferably about 0.4–0.7% or about ½%) geraniol, about 0–3% iso-butanol, about 0–0.3% iso-propanol, about 0–8% (preferably less than about 1%) n-butanol, about 0–1% phenylethanol, and optionally about 0–5% propionic acid, about 0–1% iso-butyric acid, about 0–1.2% n-butyric acid, about 0–4% iso-valeric acid, about 0–4% n-valeric acid, about 0–0.6% 2-methylvaleric acid, about 0–0.06% iso-hexanoic acid, about 0–19% n-hexanoic acid, about 0–10% cis-3-hexenoic acid, about 0–10% trans-2-hexenoic acid and about 0–4% cis-2-penten-1-ol.

Most preferably the hot-water soluble tea flavoring agent consists essentially of about 3–13% linalool, about 2–3% (or about 2%) linalool oxide, about 3–7% (or about 5%) trans-2-hexenal, about 1–3% (or about 2%) 1-penten-3-ol, about 0.7–8% trans-2-hexen-1-ol, about 2–5% cis-3-hexen-1-ol, about 3–21% iso-butanal, about 5–25% 2-methylbutanal, about 0–17% propanal, about 3–7% pentanal, about 0.9–6% (or about 1–6%) hexanal, about 6–46% acetaldehyde, about 1–16% phenylacetaldehyde, about 0–2% methyl salicylate, about 0.7–1 ½% (or about 1%) n-hexanol, about 0–0.03% beta-ionone, about 0–0.05% iso-jasmone, about 0–0.4% benzaldehyde, about 0.09–2% (or about 0.1–2%) n-pentanol, about 0.02–1% n-octanol, about 0.4–0.7% (or about ½%) geraniol, about 0–3% iso-butanol, about 0–0.3% iso-propanol, about 0–1% n-butanol and about 0–1% phenylethanol.

Another preferred hot-water soluble tea flavoring agent consists essentially of about 56% linalool, about 12% linalool oxide, about 11% trans-2-hexen-1-ol, about 15% iso-butanal, about 5% methyl salicylate, about 1% n-hexanol and about ½% geraniol.

A further hot-water soluble tea flavoring agent consists essentially of about 11% linalool, about 5% linalool oxide, about 2% trans-2-hexen-1-ol, about 6% cis-3-hexen-1-ol, about 5% hexanal, about 3% phenylacetaldehyde, about 3% methyl salicylate, about 0.8% n-hexanol and about 0.7% benzaldehyde.

The amount of flavoring agent added to the products in accordance with this invention for obtaining the desired flavoring effects in the beverage is very low and will vary within certain limits according to the type and nature of the beverage to be flavored. Good results will be achieved with total amounts of flavoring agents in the range of 0.01 to 25 parts per million (ppm) in the finished beverage, but the range of 0.1 to 5 ppm is prefered. This corresponds to an acceptable range of about 0.0023 to about 5.8 mg. of flavoring agents per gram of soluble tea solids in the tea powder with a preferred range of about 0.023 to about 1.2 mg. per gram. The incorporation of flavoring agent or flavoring agents according to this invention can be carried out at any appropriate stage in the manufacture, preparation or processing of the soluble tea product by means of conventional methods known to those skilled in the art. More specifically, it will be apparent to those skilled in the art that if the addition or incorporation of the flavoring agent or flavoring agents takes place prior to processing steps which normally eliminate some of the flavor components, an amount in excess of that desired in the final product will be required to compensate for further losses occurring in subsequent processing steps. For example, due to the selectivity of losses of volatile components occurring during a particular type of drying step, such as spray drying, vacuum belt drying or freeze drying, it may be necessary to alter not only the quantity of the flavoring agents but also their ratios. Likewise, if the addition of the flavoring agents takes place at the end of the processing operation, a lesser amount of flavoring agents will be required to be added to the processed tea.

For the benefit of those skilled in the art and to give a better understanding in the invention, the invention will be further illustrated by the following examples wherein flavoring agents are added to both cold and hot-water soluble instant teas.

Cold-Water Soluble Tea (Examples 1–3)

Cold-water soluble instant tea powders were each prepared by the addition of 100 milligrams of a different one of the flavoring agents listed in the following table to 100 grams of pure soluble tea solids in a concentrate containing approximately 35% solids. The tea concentrates were spray dried by conventional methods known to those skilled in the art. After the drying step, the final tea powders included flavoring agents in an amount of 0.5 mg. per gram of pure soluble tea solids (500 ppm). When the resulting dried soluble tea powders were reconstituted in an appropriate amount of cold water (6.5 grams of soluble tea solids/1500 grams of water), the resulting beverage, initially containing about 2.3 ppm of flavoring agent, exhibited a flavor and aroma substantially indistinguishable from that of freshly brewed tea. Although less affected by cold water (vs. hot water), this initial amount of flavoring agent was found to decrease with time through vaporization.

Cold-water tea beverages in ready-to-drink form also were prepared, each by the addition of about 2.5 milligrams of a different one of the listed flavoring agents to a solution of 6.5 grams of pure soluble tea solids in 1500 grams of water (initially containing 1.7 ppm of flavoring agent). This produced a ready-to-drink tea beverage having a fresh natural tea flavor and aroma.

The following table relates to the specific compositions (in terms of percentages by weight) of the preferred flavoring agents of Examples 1–3 employed to prepare cold-water soluble tea products as described above.

|  | Examples | | |
|---|---|---|---|
|  | 1 | 2 | 3 |
| linalool | 23.58 | 18.83 | 27.00 |
| linalool oxide | 12.82 | 10.24 | 15.12 |
| trans-2-hexenal | 14.08 | 11.25 | 7.56 |
| 1-penten-3-ol | 7.33 | 7.32 | 4.32 |
| trans-2-hexen-1-ol | 2.78 | 2.22 | 3.23 |
| cis-3-hexen-1-ol | 7.38 | 5.90 | 8.63 |
| iso-butanal | 1.73 | 3.11 | 2.16 |
| 2-methylbutanal | 1.67 | 3.18 | 4.16 |
| propanal | 1.76 | 1.41 | 2.16 |
| pentanal | 6.13 | 9.80 | 7.56 |
| hexanal | 1.82 | 1.45 | 2.16 |
| acetaldehyde | 8.54 | 17.00 | 10.80 |
| phenylacetaldehyde | 1.12 | 0.89 | 0.54 |
| methyl salicylate | 3.23 | 2.58 | 1.62 |
| n-hexanol | 2.68 | 2.14 | 3.24 |
| ethyl acetate | 1.96 | 1.57 | 0.22 |
| alpha-terpineol | 0.51 | 0.41 | 0.54 |
| nerolidol | 0.48 | 0.38 | 0.54 |
| beta-ionone | 0.21 | 0.16 | 0.22 |
| iso-jasmone | 0.19 | 0.16 | 0.22 |
|  | 100.00 | 100.00 | 100.00 |

Hot-Water Soluble Tea (Examples 4–8)

Hot-water soluble teas were prepared by the addition of 58 milligrams of the subsequently listed flavoring agents to 100 grams of pure soluble tea solids in a concentrate containing 35% solids and spray drying the concentrate by means of conventional methods (Examples 4–6). After drying, the powders included flavoring agents in an amount of 0.32 mg. per gram of soluble tea solids. When 6.5 grams of the resulting dried soluble tea powders wre reconstituted in 1500 grams of hot water, the resulting beverages initially contained 1.4 ppm of flavoring agents and exhibited flavors and aromas substantially indistinguishable from that of freshly brewed tea. As may be appreciated with the passage of time, increasing portions of the more volatile flavoring components were depleted from the tea by vaporization.

Similarly, a hot-water soluble tea was prepared by the addition of 5 milligrams of flavoring agent to 100 grams of pure soluble tea solids in a concentrate containing 7.5% solids (Example 7) and 15 milligrams of flavoring agent to 100 grams of pure soluble tea solids in a concentrate containing 7.5% solids (Example 8). The tea concentrate was freeze dried by means of conventional methods known to those skilled in the art. After the drying step, the final tea powders had flavoring agents in amounts up to 0.05 mg. and 0.15 mg., respectively, per gram of pure soluble tea solids. When 0.65 grams of the resulting dried soluble tea powders were reconstituted in 150 grams of hot water, the resulting beverages initially contained about 0.22 ppm and about 0.66 ppm, respectively, of the flavoring agents and exhibited flavors and aromas substantially indistinguishable from that of freshly brewed tea. Again these amounts were found to decrease through vaporization.

The immediately following table relates to the compositions (in terms of percentages by weight) of the preferred flavoring agents of Examples 4–7 employed to prepare hot-water soluble tea products as described above.

Following this table is a table listing the composition (in terms of percentages by weight) of the flavoring agent of Example 8 similarly employed to prepare a hot-water soluble tea product as described above.

|  | Examples | | | |
| --- | --- | --- | --- | --- |
|  | 4 | 5 | 6 | 7 |
| linalool | 12.64 | 3.0 | 3.3 | 55.66 |
| linalool oxide | 2.46 | 2.3 | 2.0 | 11.92 |
| trans-2-hexenal | 3.79 | 6.0 | 6.4 | — |
| 1-penten-3-ol | 1.87 | 2.3 | 1.0 | 10.55 |
| trans-2-hexen-1-ol | 7.48 | 1.3 | 0.7 | — |
| cis-3-hexen-1-ol | 2.48 | 4.4 | 2.0 | 15.10 |
| iso-butanal | 3.73 | 16.8 | 20.8 | — |
| 2-methylbutanal | 5.00 | 21.7 | 24.6 | — |
| propanal | 0.95 | 16.8 | — | — |
| pentanal | 6.60 | 3.4 | 3.3 | — |
| hexanal | 0.98 | 5.0 | 5.1 | — |
| acetaldehyde | 46.0 | 6.7 | 6.7 | — |
| phenylacetaldehyde | 3.60 | 1.3 | 15.3 | — |
| methyl salicylate | — | 1.7 | 0.7 | 5.00 |
| n-hexanol | 1.44 | 0.7 | 0.7 | 1.25 |
| beta-ionone | 0.03 | — | — | — |
| iso-jasmone | 0.05 | — | — | — |
| benzaldehyde | 0.37 | 0.2 | — | — |
| n-pentanol | 0.09 | 1.7 | 1.3 | — |
| n-octanol | 0.02 | 0.7 | 1.0 | — |
| geraniol | 0.42 | 0.7 | 0.7 | 0.52 |
| iso-butanol | — | 2.3 | 2.4 | — |
| iso-propanol | — | 0.3 | — | — |
| n-butanol | — | — | 1.0 | — |
| phenylethanol | — | 0.7 | 1.0 | — |
|  | 100.00 | 100.00 | 100.00 | 100.00 |

|  | Example 8 |
| --- | --- |
| linalool | 10.59 |
| cis-linalool oxide | 1.74 |
| trans-linalool oxide | 2.91 |
| trans-2-hexen-1-ol | 1.62 |
| cis-3-hexen-1-ol | 6.02 |
| hexanal | 4.69 |
| phenylacetaldehyde | 3.23 |
| methyl salicylate | 3.22 |
| n-hexanol | 0.77 |
| benzaldehyde | 0.66 |
| n-pentanol | 1.62 |
| n-butanol | 7.68 |
| propionic acid | 4.59 |
| iso-butyric acid | 0.84 |
| n-butyric acid | 1.11 |
| iso-valeric acid | 3.64 |
| n-valeric acid | 3.77 |
| 2-methylvaleric acid | 0.59 |
| iso-hexanoic acid | 0.06 |
| n-hexanoic acid | 18.52 |
| cis-3-hexenoic acid | 9.55 |
| trans-2-hexenoic acid | 9.51 |
| cis-2-penten-1-ol | 3.07 |
|  | 100.00 |

It is believed that the present invention, its mode of operation, the particular compositions of flavoring agents employed, and the advantages attendant thereto should be readily understood from the foregoing description. While various preferred embodiments and examples of the invention have been shown and described for illustrative purposes, the details thereof are nevertheless capable of wide variation within the purview of the invention as defined in the appended claims.

We claim:

1. A method for enhancing the flavor and aroma of a final tea beverage prepared from a soluble tea which comprises adding an amount of flavoring agent to the soluble tea, during or after processing, sufficient to produce a final tea beverage having therein an added flavoring agent in a flavor-enhancing amount, said flavoring agent consisting essentially of about 5–68% of at least one compound selected from the group consisting of linalool and linalool oxide, about 0–15% trans-2-hexenal, about 0–11% 1-penten-3-ol, about 0–8% trans-2-hexen-1-ol, about 2–16% cis-3-hexen-1-ol, about 0–21% iso-butanal, about 0–25% 2-methyl-butanal, about 0–17% propanal, about 0–10% pentanal, about 0–6% hexanal, about 0–46% acetaldehyde, about 0–16% phenylacetaldehyde, about 0–5% methyl salicylate, about 0–4% n-hexanol, about 0–2% ethyl acetate, about 0–0.6% alpha-terpineol, about 0–0.6% nerolidol, about 0–0.3% beta-ionone, about 0–0.3% iso-jasmone, about 0–0.7% benzaldehyde, about 0–2% n-pentanol, about 0–1% n-octanol, about 0–0.7% geraniol, about 0–3% iso-butanol, about 0–0.3% iso-propanol, about 0–8% n-butanol, about 0–1% phenylethanol, about 0–5% propionic acid, about 0–1% iso-butyric acid, about 0–1.2% n-butyric acid, about 0–4% iso-valeric acid, about 0–4% n-valeric acid, about 0–0.6% 2-methylvaleric acid, about 0–0.06% iso-hexanoic acid, about 0–19% n-hexanoic acid, about 0–10% cis-3-hexanoic acid, about 0–10% trans-2-hexanoic acid and about 0–4% cis-2-penten-1-ol.

2. A method according to claim 1 wherein said flavoring agent is added in an amount to produce a final tea beverage having therein an added flavoring agent in an amount of about 0.01–25 ppm.

3. A method according to claim 1 wherein said flavoring agent is added in an amount to produce a final tea beverage having therein an added flavoring agent in an amount of about 0.1–5 ppm.

4. A method according to claim 1 wherein said soluble tea is dried and said flavoring agent is added to said soluble tea prior to said drying.

5. A method according to claim 1 wherein said soluble tea is dried and said flavoring agent is added to said soluble tea after drying.

6. A method according to claim 1 wherein said flavoring agent includes at least about 0.7% n-hexanol.

7. A method according to claim 1 wherein said flavoring agent consists essentially of about 5–68% of at least one compound selected from a group consisting of linalool and linalool oxide, about 0–15% trans-2-hexanal, about 1–11% 1-penten-3-ol, about 0–8% trans-2-hexen-1-ol, about 2–16% cis-3-hexen-1-ol, about 0–21% iso-butanal, about 0–25% 2-methylbutanal, about 0–17% propanal, about 0–10% pentanal, about 0–16% hexanal, about 0–46% acetaldehyde, about 0–16% phenylacetaldehyde, about 0–5% methyl salicylate, about 0–4% n-hexanol, about 0–2% ethyl acetate, about 0–0.6% alpha-terpineol, about 0–0.6% nerolidol, about 0–0.3% beta-ionone, about 0–0.3% iso-jasmone, about 0–0.4% benzaldehyde, about 0–2% n-pentanol, about 0–1% n-octanol, about 0.4–0.7% geraniol, about 0–3% iso-butanol, about 0–0.3% iso-propanol, about 0–1% n-butanol and about 0–1% phenylethanol.

8. A method according to claim 7 wherein said flavoring agent includes about 3–56% linalool and about 2–16% linalool oxide.

9. A method according to claim 7 wherein said soluble tea is a cold-water soluble tea and said flavoring agent consists essentially of about 18–27% linalool, about 10–16% linalool oxide, about 7–15% trans-2-hexenal, about 4–8% 1-penten-3-ol, about 2–4% trans-2-hexen-1-ol, about 5–9% cis-3-hexen-1-ol, about 1–4% iso-butanal, about 1–15% 2-methylbutanal, about 1–3% propanal, about 6–10% pentanal, about 1–3% hexenal, about 8–17% acetaldehyde, about ½–1.2% phenylacetaldehyde, about 1–4% methyl salicylate, about 2–4% n-hexenol, about 0.2–2% ethyl acetate, about 0.4–0.6% alpha-terpineol, about 0.3–0.6% nerolidol, about 0.1–0.3% beta-ionone and about 0.1–0.3% iso-jasmone.

10. A method according to claim 7 wherein said soluble tea is a cold-water soluble tea and said flavoring agent consists essentially of about 18–27% linalool, about 10–16% linalool oxide, about 7–15% trans-2-hexenal, about 4–8% 1-penten-3-ol, about 2–4% trans-2-hexen-1-ol, about 5–9% cis-3-hexen-1-ol, about 1–4% iso-butanal, about 1–5% 2-methylbutanal, about 1–3% propanal, about 6–10% pentanal, about 1–3% hexenal, about 8–17% acetaldehyde, about ½–1.2% phenylacetaldehyde, about 1–4% methyl salicylate, about 2–4% n-hexanal, about 0.2–2% ethyl acetate, about ½% alpha-terpineol, about ½% nerolidol, about 0.2% beta-ionone and about 0.2% iso-jasmone.

11. A method according to claim 7 wherein said soluble tea is a cold-water soluble tea and said flavoring agent consists essentially of about 29–43% of at least one member selected from the group consisting of linalool and linalool oxide, about 7–15% trans-2-hexenal, about 4–8% 1-penten-3-ol, about 2–4% trans-2-hexen-1-ol, about 5–9% cis-3-hexen-1-ol, about 1–4% iso-butanal, about 1–5% 2-methylbutanal, about 1–3% propanal, about 6–10% pentanal, about 1–3% hexanal, about 8–17% acetaldehyde, about ½–1.2% phenylacetaldehyde, about 1–4% methyl salicylate, about 2–4% n-hexanol, about 0.2–2% ethyl acetate, about 0.4–0.6% alpha-terpineol, about 0.3–0.6% nerolidol, about 0.1–0.3% beta-ionone and about 0.1–0.3% iso-jasmone.

12. A method according to claim 1 wherein said soluble tea is a hot-water soluble tea and said flavoring agent consists essentially of about 5–68% of at least one member selected from the group consisting of linalool and linalool oxide, about 0–7% trans-2-hexenal, about 0–11% 1-penten-3-ol, about 0–8% trans-2-hexen-1-ol, about 2–16% cis-3-hexen-1-ol, about 0–21% iso-butanal, about 0–25% 2-methylbutanal, about 0–17% propanal, about 0–7% pentanal, about 0–6% hexanal, about 0–46% acetaldehyde, about 0–16% phenylacetaldehyde, about 0–5% methyl salicylate, about 0.7–1½% n-hexanol, about 0–0.03% beta-ionone, about 0–0.05% iso-jasmone, about 0–0.7% benzaldehyde, about 0–2% n-pentanol, about 0–1% n-octanol, about 0–0.7% geraniol, about 0–3% iso-butanol, about 0–0.3% iso-propanol, about 0–8% n-butanol, about 0–1% phenylethanol, about 0–5% propionic acid, about 0–1% iso-butyric acid, about 0–1.2% n-butyric acid, about 0–4% iso-valeric acid, about 0–4% n-valeric acid, about 0–0.6% 2-methylvaleric acid, about 0–0.06% iso-hexanoic acid, about 0–19% n-hexanoic acid, about 0–10% cis-3-hexanoic acid, about 0–10% trans-2-hexanoic acid and about 0–4% cis-2-penten-1-ol.

13. A method according to claim 12 wherein said flavoring agent consists essentially of about 11% linalool, about 5% linalool oxide, about 2% trans-2-hexen-1-ol, about 6% cis-3-hexen-1-ol, about 5% hexanal, about 3% phenylacetaldehyde, about 3% methyl salicylate, about 0.8% n-hexanol, about 0.7% benzaldehyde, about 2% n-pentanol, about 8% n-butanol, about 5% propionic acid, about 0.8% iso-butyric acid, about 1% n-butyric acid, about 4% iso-valeric acid, about 4% n-valeric acid, about 0.6% 2-methyl-valeric acid, about 0.06% iso-hexanoic acid, about 19% n-hexanoic acid, about 10% cis-3-hexenoic acid, about 10% trans-2-hexenoic acid and about 3% cis-2-penten-1-ol.

14. A method according to claim 2 wherein said flavoring agent consists essentially of about 5–68% of at least one member selected from the group consisting of linalool and linalool oxide, about 0–7% trans-2-hexenal, about 1–11% 1-penten-3-ol, about 0–8% trans-2-hexen-1-ol, about 2–16% cis-3-hexen-1-ol, about 0–21% iso-butanal, about 0–25% 2-methylbutanal, about 0–17% propanal, about 0–7% pentanal, about 0–6% hexanal, about 0–46% acetaldehyde, about 0–16% phenylacetaldehyde, about 0–5% methyl salicylate, about 0.7–1½% n-hexanol, about 0–0.03% beta-ionone, about 0–0.05% iso-jasmone, about 0–0.4% benzaldehyde, about 0–2% n-pentanol, about 0–1% n-octanol, about 0.4–0.7% geraniol, about 0–3% iso-butanol, about 0–0.3% iso-propanol, about 0–1% n-butanol and about 0–1% phenylethanol.

15. A method according to claim 14 wherein said flavoring agent includes about 3–56% linalool and about 2–12% linalool oxide.

16. A method according to claim 14 wherein said flavoring agent consists essentially of about 3–13% linalool, about 2–3% linalool oxide, about 3–7% trans-2-hexenal, about 1–3% 1-penten-3-ol, about 0.7–8% trans-2-hexen-1-ol, about 2–5% cis-3-hexen-1-ol, about 3–21% iso-butanal, about 5–25% 2-methylbutanal, about 0–17% propanal, about 3–7% pentanal, about 0.9–6% hexanal, about 6–46% acetaldehyde, about 1–16% phenylacetaldehyde, about 0–2% methyl salicylate, about 0.7–1½% n-hexanol, about 0–0.03% beta-ionone, about 0–0.05% iso-jasmone, about 0–0.4% benzaldehyde, about 0.09–2% n-pentanol, about 0.02–1% n-octanol, about 0.4–0.7% geraniol, about 0–3% iso-butanol, about 0–0.3% iso-propanol, about 0–1% n-butanol and about 0–1% phenylethanol.

17. A method according to claim 1 wherein said soluble tea is a hot-water soluble tea and said flavoring agent consists essentially of about 3–56% linalool, about 2–12% linalool oxide, about 0–7% trans-2-hexanal, about 0–11% 1-penten-3-ol, about 0–8% trans-2-hexen-1-ol, about 2–16% cis-3-hexen-1-ol, about 0–21% iso-butanal, about 0–25% 2-methylbutanal, about 0–17% propanal, about 0–7% pentanal, about 0–6% hexanal, about 0–46% acetaldehyde, about 0–16% phenylacetaldehyde, about 0–5% methyl salicylate, about 1% n-hexanol, about 0–0.03% beta-ionone, about 0–0.05% iso-jasmone, about 0–0.7% benzaldehyde, about 0–2% n-pentanol, about 0–1% n-octanol, about 0–0.7% geraniol, about 0–3% iso-butanol, about 0–0.3% iso-propanol, about 0–8% n-butanol, about 0–1% phenylethanol, about 0–5% propionic acid, about 0–1% iso-butyric acid, about 0–1.2% n-butyric acid, about 0–4% iso-valeric acid, about 0–4% n-valeric acid, about 0–0.6% 2-methylvaleric acid, about 0–0.06% iso-hexanoic acid, about 0–19% n-hexanoic acid, about 0–10% cis-3-hexanoic acid, about 0–10% trans-2-hexanoic acid and about 0–4% cis-2-penten-1-ol.

18. A method according to claim 17 wherein said flavoring agent consists essentially of about 3–56% linalool, about 2–12% linalool oxide, about 0–7% trans-2-hexenal, about 1–11% 1-penten-3-ol, about 0–8% trans-2-hexen-1-ol, about 2–16% cis-3-hexen-1-ol, about 0–21% iso-butanal, about 0–25% 2-methylbutanal, about 0–17% propanal, about 0–7% pentanal, about 0–6% hexanal, about 0–46% acetaldehyde, about 0–16% phenylacetaldehyde, about 0–5% methyl salicylate, about 1% n-hexanol, about 0–0.03% beta-ionone, about 0–0.05% iso-jasmone, about 0–0.4% benzaldehyde, about 0–2% n-pentanol, about 0–1% n-octanol, about ½% geraniol, about 0–3% iso-butanol, about 0–0.3% iso-propanol, about 0–1% n-butanol and about 0–1% phenylethanol.

19. A method according to claim 18 wherein said flavoring agent consists essentially of about 3–13% linalool, about 2% linalool oxide, about 5% trans-2-hexenal, about 2% 1-penten-3-ol, about 0.7–8% trans-2-hexen-1-ol, about 2–5% cis-3-hexen-1-ol, about 3–21% iso-butanal, about 5–25% 2-methylbutanal, about 0–17% propanal, about 3–7% pentanal, about 1–6% hexanal, about 6–46% acetaldehyde, about 1–16% phenylacetaldehyde, about 0–2% methyl salicylate, about 1% n-hexanol, about 0–0.03% beta-ionone, about 0–0.05% iso-jasmone, about 0–0.4% benzaldehyde, about 0.1–2% n-pentanol, about 0.02–1% n-octanol, about  % geraniol, about 0–3% iso-butanol, about 0–0.3% iso-propanol, about 0–1% n-butanol and about 0–1% phenylethanol.

20. A method according to claim 18 wherein said flavoring agent consists essentially of about 56% linalool, about 12% linalool oxide, about 11% trans-2-hexen-1-ol, about 15% isobutanal, about 5% methyl salicylate, about 1% n-hexanol and about ½% geraniol.

21. A final tea beverage prepared from a soluble tea; said soluble tea containing a flavor-enhancing amount of a flavoring agent; said flavoring agent consisting essentially of about 5–68% of at least one compound selected from the group consisting of linalool and linalool oxide, about 0–15% trans-2-hexenal, about 0–11% 1-penten-3-ol, about 0–8% trans-2-hexen-1-ol, about 2–16% cis-3-hexen-1-ol, about 0–21% iso-butanal, about 0–25% 2-methylbutanal, about 0–17% propanal, about 0–10% pentanal, about 0–6% hexanal, about 0–46% acetaldehyde, about 0–16% phenylacetaldehyde, about 0–5% methyl salicylate, about 0–4% n-hexanol, about 0–2% ethyl acetate, about 0–0.6% alpha-terpineol, about 0–0.6% nerolidol, about 0–0.3% beta-ionone, about 0–0.3% iso-jasmone, about 0–0.7% benzaldehyde, about 0–2% n-pentanol, about 0–1% n-octanol, about 0–0.7% geraniol, about 0–3% iso-butanol, about 0–0.3% iso-propanol, about 0–8% n-butanol, about 0–1% phenylethanol, about 0–5% propionic acid, about 0–1% iso-butyric acid, about 0–1.2% n-butyric acid, about 0–4% iso-valeric acid, about 0–4% n-valeric acid, about 0–0.6% 2-methylvaleric acid, about 0–0.06% iso-hexanoic acid, about 0–19% n-hexanoic acid, about 0–10% cis-3-hexenoic acid, about 0–10% trans-2-hexenoic acid and about 0–4% cis-2-penten-1-ol.

22. A product according to claim 21 wherein the amount of said flavoring agent in said final tea beverage is about 0.01–25 ppm.

23. A product according to claim 21 wherein the amount of said flavoring agent in said final tea beverage is about 0.1–5 ppm.

24. A product according to claim 21 wherein said flavoring agent includes at least about 0.7% n-hexanol.

25. A product according to claim 21 wherein said flavoring agent consists essentially of about 5–68% of at least one compound selected from a group consisting of linalool and linalool oxide, about 0–15% trans-2-hexenal, about 1–11% 1-penten-3-ol, about 0–8% trans-2-hexen-1-ol, about 2–16% cis-3-hexen-1-ol, about 0–21% iso-butanal, about 0–25% 2-methylbutanal, about 0–17% propanal, about 0–10% pentanal, about 0–6% hexanal, about 0–46% acetaldehyde, about 0–16% phenylacetaldehyde, about 0–5% methyl salicylate, about 0–4% n-hexanol, about 0–2% ethyl acetate, about 0–0.6% alpha-terpineol, about 0–0.6% nerolidol, about 0–0.3% beta-ionone, about 0–0.3% iso-jasmone, about 0–0.4% benzaldehyde, about 0–2% n-pentanol, about 0–1% n-octanol, about 0.4–0.7% geraniol, about 0–3% iso-butanol, about 0–0.3% iso-propanol, about 0–1% n-butanol and about 0–1% phenylethanol.

26. A product according to claim 25 wherein said flavoring agent includes about 3–56% linalool and about 2–16% linalool oxide.

27. A product according to claim 25 wherein said soluble tea is a cold-water soluble tea and said flavoring agent consists essentially of about 18–27% linalool, about 10–16% linalool oxide, about 7–15% trans-2-hexenal, about 4–8% 1-penten-3-ol, about 2–4% trans-2-hexen-1-ol, about 5–9% cis-3-hexen-1-ol, about 1–4% iso-butanal, about 1–5% 2-methylbutanal, about 1–3% propanal, about 6–10% pentanal, about 1–3% hexanal, about 8–17% acetaldehyde, about ½–1.2% phenylacetaldehyde, about 1–4% methyl salicylate, about 2–4% n-hexanol, about 0.2–2% ethyl acetate, about 0.4–0.6% alpha-terpineol, about 0.3–0.6% nerolidol, about 0.1–0.3% beta-ionone and about 0.1–0.3% iso-jasmone.

28. A product according to claim 25 wherein said soluble tea is a cold-water soluble tea and said flavoring agent consists essentially of about 18–27% linalool, about 10–16% linalool oxide, about 7–15% trans-2-hexenal, about 4–8% 1-penten-3-ol, about 2–4% trans-2-hexen-1-ol, about 5–9% cis-3-hexen-1-ol, about 1–4% iso-butanal, about 1–5% 2-methylbutanal, about 1–3% propanal, about 6–10% pentanal, about 1–3% hexanal, about 8–17% acetaldehyde, about ½–1.2% phenylacetaldehyde, about 1–4% methyl salicylate, about 2–4% n-hexanol, about 0.2–2% ethyl acetate, about ½% alpha-terpineol, about ½% nerolidol, about 0.2% beta-ionone and about 0.2% iso-jasmone.

29. A product according to claim 25 wherein said soluble tea is a cold-water soluble tea and said flavoring agent consists essentially of about 29–43% of at least one member selected from the group consisting of linalool and linalool oxide, about 7–15% trans-2-hexenal, about 4–8% 1-penten-3-ol, about 2–4% trans-2-hexen-1-ol, about 5–9% cis-3-hexen-1-ol, about 1–4% iso-butanal, about 1–5% 2-methylbutanal, about 1–3% propanal, about 6–10% pentanal, about 1–3% hexanal, about 8–17% acetaldehyde, about ½–1.2% phenylacetaldehyde, about 1–4% methyl salicylate, about 2–4% n-hexanol, about 0.2–2% ethyl acetate, about 0.4–0.6% alpha-terpineol, about 0.3–0.6% nerolidol, about 0.1–0.3% beta-ionone and about 0.1–0.3% iso-jasmone.

30. A product according to claim 21 wherein said soluble tea is a hot-water soluble tea and said flavoring agent consists essentially of about 5–68% of at least one member selected from the group consisting of linalool and linalool oxide, about 0–7% trans-2-hexenal, about 0–11% 1-penten-3-ol, about 0–8% trans-2-hexen-1-ol, about 2–16% cis-3-hexen-1-ol, about 0–21% iso-butanal, about 0–25% 2-methylbutanal, about 0–17% propanal, about 0–7% pentanal, about 0–6% hexanal, about 0–46% acetaldehyde, about 0–16% phenylacetaldehyde, about 0–5% methyl salicylate, about 0.7–1½% n-hexanol, about 0–0.03% beta-ionone, about 0–0.05% iso-jasmone, about 0–0.7% benzaldehyde, about 0–2% n-pentanol, about 0–1% n-octanol, about 0–0.7% geraniol, about 0–3% iso-butanol, about 0–0.3% iso-propanol, about 0–8% n-butanol, about 0–1% phenylethanol, about 0–5% propionic acid, about 0–1% iso-butyric acid, about 0–1.2% n-butyric acid, about 0–4% iso-valeric acid, about 0–4% n-valeric acid, about 0–0.6% 2-methylvaleric acid, about 0–0.06% iso-hexanoic acid, about 0–19% n-hexanoic acid, about 0–10% cis-3-hexenoic acid, about 0–10% trans-2-hexenoic acid and about 0–4% cis-2-penten-1-ol.

31. A product according to claim 30 wherein said flavoring agent consists essentially of about 11% linalool, about 5% linalool oxide, about 2% trans-2-hexen-1-ol, about 6% cis-3-hexen-1-ol, about 5% hexanal, about 3% phenylacetaldehyde, about 3% methyl salicylate, about 0.8% n-hexanol, about 0.7% benzaldehyde, about 2% n-pentanol, about 8% n-butanol, about 5% propionic acid, about 0.8% iso-butyric acid, about 1% n-butyric acid, about 4% iso-valeric acid, about 4% n-valeric acid, about 0.6% 2-methyl-valeric acid, about 0.06% iso-hexanoic acid, about 19% n-hexanoic acid, about 10% cis-3-hexenoic acid, about 10% trans-2-hexenoic acid and about 3% cis-2-penten-1-ol.

32. A product according to claim 30 wherein said flavoring agent consists essentially of about 5–68% of at least one member selected from the group consisting of linalool and linalool oxide, about 0–7% trans-2-hexenal, about 1–11% 1-penten-3-ol, about 0–8% trans-2-hexen-1-ol, about 2–16% cis-3-hexen-1-ol, about 0–21% iso-butanal, about 0–25% 2-methylbutanal, about 0–17% propanal, about 0–7% pentanal, about 0–6% hexanal, about 0–46% acetaldehyde, about 0–16% phenylacetaldehyde, about 0–5% methyl salicylate, about 0.7–1½% n-hexanol, about 0–0.03% beta-ionone, about 0–0.05% iso-jasmone, about 0–0.4% benzaldehyde, about 0–2% n-pentanol, about 0–1% n-octanol, about 0.4–0.7% geraniol, about 0–3% iso-butanol, about 0–0.3% iso-propanol, about 0–1% n-butanol and about 0–1% phenylethanol.

33. A product according to claim 32 wherein said flavoring agent includes about 3–56% linalool and about 2–12% linalool oxide.

34. A product according to claim 32 wherein said flavoring agent consists essentially of about 3–13% linalool, about 2–3% linalool oxide, about 3–7% trans-2-hexenal, about 1–3% 1-penten-3-ol, about 0.7–8% trans-2-hexen-1-ol, about 2–5% cis-3-hexen-1-ol, about 3–21% iso-butanal, about 5–25% 2-methylbutanal, about 0–17% propanal, about 3–7% pentanal, about 0.9–6% hexanal, about 6–46% acetaldehyde, about 1–16% phenylacetaldehyde, about 0–2% methyl salicylate, about 0.7–1½% n-hexanol, about 0–0.03% beta-ionone, about 0–0.05% iso-jasmone, about 0–0.4% benzaldehyde, about 0.09–2% n-pentanol, about 0.02–1% n-octanol, about 0.4–0.7% geraniol, about 0–3% iso-butanol, about 0–0.3% iso-propanol, about 0–1% n-butanol and about 0–1% phenylethanol.

35. A product according to claim 21 wherein said soluble tea is a hot-water soluble tea and said flavoring agent consists essentially of about 3–56% linalool, about 2–12% linalool oxide, about 0–7% trans-2-hexenal, about 0–11% 1-penten-3-ol, about 0–8% trans-2-hexen-1-ol, about 2–16% cis-3-hexen-1-ol, about 0–21% iso-butanal, about 0–25% 2-methylbutanal, about 0–17% propanal, about 0–7% pentanal, about 0–6% hexanal, about 0–46% acetaldehyde, about 0–16% phenylacetaldehyde, about 0–5% methyl salicylate, about 1% n-hexanol, about 0–0.03% beta-ionone, about 0–0.05% iso-jasmone, about 0–0.7% benzaldehyde, about 0–2% n-pentanol, about 0–1% n-octanol, about 0–0.7% geraniol, about 0–3% iso-butanol, about 0–0.3% iso-propanol, about 0–8% n-butanol, about 0–1% phenylethanol, about 0–5% propionic acid, about 0–1% iso-butyric acid, about 0–1.2% n-butyric acid, about 0–4% iso-valeric acid, about 0–4% n-valeric acid, about 0–0.6% 2-methylvaleric acid, about 0–0.06% iso-hexanoic acid, about 0–19% n-hexanoic acid, about 0–10% cis-3-hexenoic acid, about 0–10% trans-2-hexenoic acid and about 0–4% cis-2-penten-1-ol.

36. A product according to claim 35 wherein said flavoring agent consists essentially of about 3–56% linalool, about 2–12% linalool oxide, about 0–7% trans-2-hexenal, about 1–11% 1-penten-3-ol, about 0–8% trans-2-hexen-1-ol, about 2–16% cis-3-hexen-1-ol, about 0–21% iso-butanal, about 0–25% 2-methylbutanal, about 0–17% propanal, about 0–7% pentanal, about 0–6% hexanal, about 0–46% acetaldehyde, about 0–16% phenylacetaldehyde, about 0–5% methyl salicylate, about 1% n-hexanol, about 0–0.03% beta-ionone, about 0–0.05% iso-jasmone, about 0–0.4% benzaldehyde, about 0–2% n-pentanol, about 0–1% n-octanol, about ½% geraniol, about 0–3% iso-butanol, about 0–0.3% iso-propanol, about 0–1% n-butanol and about 0–1% phenylethanol.

37. A product according to claim 36 wherein said flavoring agent consists essentially of about 3–13% linalool, about 2% linalool oxide, about 5% trans-2-hexenal, about 2% 1-penten-3-ol, about 0.7–8% trans-2-hexen-1-ol, about 2–5% cis-3-hexen-1-ol, about 3–21% iso-butanal, about 5–25% 2-methylbutanal, about 0–17% propanal, about 3–7% pentanal, about 1–6% hexanal, about 6–46% acetaldehyde, about 1–16% phenylacetaldehyde, about 0–2% methyl salicylate, about 1% n-hexanol, about 0–0.03% beta-ionone, about 0–0.05% iso-jasmone, about 0–0.4% benzaldehyde, about 0.1–2% n-pentanol, about 0.02–1% n-octanol, about ½% geraniol, about 0–3% iso-butanol, about 0–0.3% iso-propanol, about 0–1% n-butanol and about 0–1% phenylethanol.

38. A product according to claim 36 wherein said flavoring agent consists essentially of about 56% linalool, about 12% linalool oxide, about 11% trans-2-hexen-1-ol, about 15% iso-butanal, about 5% methyl salicylate, about 1% n-hexanol and about ½% geraniol.

39. A flavoring agent for enhancing the flavor and aroma of a final tea beverage consisting essentially of about 5–68% of at least one compound selected from the group consisting of linalool and linalool oxide, about 0–15% trans-2-hexenal, about 0–11% 1-penten-3-ol, about 0–8% trans-2-hexen-1-ol, about 2–16% cis-3-hexen-1-ol, about 0–21% iso-butanal, about 0–25% 2-methyl-butanal, about 0–17% propanal, about 0–10% pentanal, about 0–6% hexanal, about 0–46% acetaldehyde, about 0–16% phenylacetaldehyde, about 0–5% methyl salicylate, about 0–4% n-hexanol, about 0–2% ethyl acetate, about 0–0.6% alpha-terpineol, about 0–0.6% nerolidol, about 0–0.3% beta-ionone, about 0–0.3% iso-jasmone, about 0–0.7% benzaldehyde, about 0–2% n-pentanol, about 0–1% n-octanol, about 0–0.7% geraniol, about 0–3% iso-butanol, about 0–0.3 % iso-propanol, about 0–8% n- butanol, about 0–1% phenylethanol, about 0–5% propionic acid, about 0–1% iso-butyric acid, about 0–1.2% n-butyric acid, about 0–4% iso-valeric acid, about 0–4% n-valeric acid, about 0–0.6% 2-methylvaleric acid, about 0–0.06% iso-hexanoic acid, about 0–19% n-hexanoic acid, about 0–10% cis-3-hexenoic acid, about 0–10% trans-2-hexenoic acid and about 0–4% cis-2-penten-1-ol.

40. A product according to claim 39 wherein said flavoring agent includes at least about 0.7% n-hexanol.

41. A product according to claim 39 wherein said flavoring agent consists essentially of about 5–68% of at least one compound selected from a group consisting of linalool and linalool oxide, about 0–15% trans-2-hexenal, about 1–11% 1-penten-3-ol, about 0–8% trans-2-hexen-1-ol, about 2–16% cis-3-hexen-1-ol, about 0–21% iso-butanal, about 0–25% 2-methylbutanal, about 0–17% propanal, about 0–10% pentanal, about 0–6% hexanal, about 0–46% acetaldehyde, about 0–16% phenylacetaldehyde, about 0–5% methyl salicylate, about 0–4% n-hexanol, about 0–2% ethyl acetate, about 0–0.6% alpha-terpineol, about 0–0.6% nerolidol, about 0–0.3% beta-ionone, about 0–0.3% iso-jasmone, about 0–0.4% benzaldehyde, about 0–2% n-pentanol, about 0–1% n-octanol, about 0.4–0.7% geraniol, about 0–3% iso-butanol, about 0–0.3% iso-propanol, about 0– 1% n-butanol and about 0–1% phenylethanol.

42. A product according to claim 41 wherein said flavoring agent includes about 3–56% linalool and about 2–16% linalool oxide.

43. A product according to claim 41 wherein said flavoring agent is a cold-water soluble tea flavoring agent consisting essentially of about 18–27% linalool, about 10–16% linalool oxide, about 7–15% trans-2-hexenal, about 4–8% 1-penten-3-ol, about 2–4% trans-2-hexen-1-ol, about 5–9% cis-3-hexen-1-ol, about 1–4% iso-butanal, about 1–5% 2-methylbutanal, about 1–3% propanal, about 6–10% pentanal, about 1–3% hexanal, about 8–17% acetaldehyde, about ½–1.2% phenylacetaldehyde, about 1–4% methyl salicylate, about 2–4% n-hexanol, about 0.2–2% ethyl acetate, about 0.4–0.6% alpha-terpineol, about 0.3–0.6% nerolidol, about 0.1–0.3% beta-ionone and about 0.1–0.3% iso-jasmone.

44. A product according to claim 41 wherein said flavoring agent is a cold-water soluble tea flavoring agent consisting essentially of about 18–27% linalool, about 10–16% linalool oxide, about 7–15% trans-2-hexenal, about 4–8% 1-penten-3-ol, about 2–4% trans-2-hexen-1-ol, about 5–9% cis-3-hexen-1-ol, about 1–4% iso-butanal, about 1–5% 2-methylbutanal, about 1–3% propanal, about 6–10% pentanal, about 1–3% hexanal, about 8–17% acetaldehyde, about ½–1.2% phenylacetaldehyde, about 1–4% methyl salicylate, about 2–4% n-hexanal, about 0.2–2% ethyl acetate, about ½% alpha-terpineol, about ½% nerolidol, about 0.2% beta-ioneol and about 0.2% iso-jasmone.

45. A product according to claim 41 wherein said flavoring agent is a cold-water soluble tea flavoring agent consisting essentially of about 29–43% of at least one member selected from the group consisting of linalool and linalool oxide, about 7–15% trans-2-hexenal, about 4–8% 1-penten-3-ol, about 2–4% trans-2-hexen-1-ol, about 5–9% cis-3-hexen-1-ol, about 1–4% iso-butanal, about 1–5% 2-methylbutanal, about 1–3% propanal, about 6–10% pentanal, about 1–3% hexanal, about 8–17% acetaldehyde, about ½–1.2% phenylacetaldehyde, about 1–4% methyl salicylate, about 2–4% n-hexanol, about 0.2–2% ethyl acetate, about 0.4–0.6% alpha-terpineol, about 0.3–0.6% nerolidol, about 0.1–0.3% beta-ionone and about 0.1–0.3% iso-jasmone.

46. A product according to claim 39 wherein said flavoring agent is a hot-water soluble tea flavoring agent consisting essentially of about 5–68% of at least one member selected from the group consisting of linalool and linalool oxide, about 0–7% trans-2-hexenal, about 0–11% 1-penten-3-ol, about 0–8% trans-2-hexen-1-ol, about 2–16% cis-3-hexen-1-ol, about 0–21% iso-butanal, about 0–25% 2-methylbutanal, about 0–17% propanal, about 0–7% pentanal, about 0–6% hexanal, about 0–46% acetaldehyde, about 0–16% phenylacetaldehyde, about 0–5% methyl salicylate, about 0.7–1 ½% n-hexanol, about 0–0.03% beta-ionone, about 0–0.05% iso-jasmone, about 0–0.7% benzaldehyde, about 0–2% n-pentanol, about 0–1% n-octanol, about 0–0.7% geraniol, about 0–3% iso-butanol, about 0–0.3% iso-propanol, about 0–8% n-butanol, about 0–1% phenylethanol, about 0–5% propionic acid, about 0–1% iso-butyric acid, about 0–1.2% n-butyric acid, about 0–4% iso-valeric acid, about 0–4% n-valeric acid, about 0–0.6% 2-methylvaleric acid, about 0–0.:6% iso-hexanoic acid, about 19% n-hexanoic acid, about 0–10% cis-3-hexenoic acid, about 0–10% trans-2-hexenoic acid and about 0–4% cis-2-penten-1-ol.

47. A product according to claim 46 wherein said flavoring agent consists essentially of about 11% linalool, about 5% linalool oxide, about 2% trans-2-hexen-1-ol, about 6% cis-3-hexen-1-ol, about 5% hexanal, about 3% phenylacetaldehyde, about 3% methyl salicylate, about 0.8% n-hexanol, about 0.7% benzaldehyde, about 2% n-pentanol, about 8% n-butanol, about 5% propionic acid, about 0.8% iso-butyric acid, about 1% n-butyric acid, about 4% iso-valeric acid, about 4% n-valeric acid, about 0.6% 2-methylvaleric acid, about 0.06% iso-hexanoic acid, about 19% n-hexanoic acid, about 10% cis-3-hexenoic acid, about 10% trans-2-hexenoic acid and about 3% cis-2-penten-1-ol.

48. A product according to claim 46 wherein said flavoring agent consists essentially of about 5–68% of at least one member selected from the group consisting of linalool and linalool oxide, about 0–7% trans-2-hexenal, about 1–11% 1-penten-3-ol, about 0–8% trans-2-hexen-1-ol, about 2–16% cis-3-hexen-1-ol, about 0–21% iso-butanal, about 0–25% 2-methylbutanal, about 0–17% propanal, about 0–7% pentanal, about 0–6% hexanal, about 0–46% acetaldehyde, about 0–16% phenylacetaldehyde, about 0–5% methyl salicylate, about 0.7–1½% n-hexanol, about 0–0.03% beta-ionone, bout 0–0.5% iso-jasmone, about 0–0.4% benzaldehyde, about 0–2% n-pentanol, about 0–1% n-octanol, about 0.4–0.7% geraniol, about 0–3% iso-butanol, about 0–0.3% iso-propanol, about 0–1% n-butanol and about 0–1% phenylethanol.

49. A product according to claim 48 wherein said flavoring agent includes about 3–56% linalool and about 2–12% linalool oxide.

50. A product according to claim 48 wherein said flavoring agent consists essentially of about 3–13% linalool, about 2–3% linalool oxide, about 3–7% trans-2-hexenal, about 1–3% 1-penten-3-ol, about 0.7–8% trans-2-hexen-1-ol, about 2–5% cis-3-hexen-1-ol, about 3–21% iso-butanaol, about 5–25% 2-methylbutanal, about 0–17% propanal, about 3–7% pentanal, about 0.9–6% hexanal, about 6–46% acetaldehyde, about 1–16% phenylacetaldehyde, about 0–2% methyl salicylate, about 0.7–1 ½% n-hexanol, about 0–0.03% beta-ionnone, about 0–0.05% iso-iasomone, about 0–0.4% benzaldehyde, about 0.09–2% n-pentanol, about 0.02–1% n-octanol, about 0.4–0.7% geraniol, about 0–3% iso-butanol, about 0–0.3% iso-propanol, about 0–1% n-butanol and about 0–1% phenylethanol.

51. A product according to claim 39 wherein said flavoring agent is a hot-water solutble tea flavoring agent consisting essentially of about 3–56% linalool, about 2–12% linalool oxide, about 0–7% trans-2-hexenal, about 0–11% 1-penten-3-ol, about 0–8% trans-2-hexen-1-ol, about 2–16% cis-3-hexen-1-ol, about 0–21% isobutanal, about 0–25% 2-methylbutanal, about 0–17% propanal, about 0–7% pentanal, about 0–6% hexanal, about 0–46% acetaldehyde, about 0–16% phenylacetaldehyde, about 0–5% methyl salicylate, about 1% n-hexanol, about 0–0.03% beta-ionone, about 0–0.05% iso-jasmone, about 0–0.7% benzaldehyde, about 0–2% n-pentanol, about 0–1% noctanol, about 0–0.7% geraniol, about 0–3% iso-butanol, about 0.03% iso-propanol, about 0–8% n-butanol, about 0–1% phenylethanol, about 0–5% propionic acid, about 0–1% iso-butyric acid, about 0–1.2% n-butyric acid, about 0–4% iso-valeric acid, about 0–4% n-valeric acid, about 0–0.6% 2-methylvaleric acid, about 0–0.06% iso-hexanoic acid, about 0–19% n-hexanoic acid, about 0–10% cis-3-hexenoic acid, about 0–10% trans-2-hexenoic acid and about 0–4% cis-2-penten-1-ol.

52. A product according to claim 51 wherein said flavoring agent consists essentially of about 3–56% linalool, about 2–12% linalool oxide, about 0–7% trans-2-hexenal, about 1–11% 1-penten-3-ol, about 0–8% trans-2-hexen-1-ol, about 2–16% cis-3-hexen-1-ol, about 0–21% iso-butanal, about 0–25% 2-methylbutanal, about 0–17% propanal, about 0–7% pentanal, about 0–6% hexanal, about 0–46% acetaldehyde, about 0–16% phenylacetaldehyde, about 0–5 % methyl salicylate, about 1% n-hexanol, about 0–0.03% beta-ionone, about 0–0.05% iso-jasmone, about 0–0.4% benzaldehyde, about 0–2% n-pentanol, about 0–1% n-octanol, about ½% geraniol, about 0–3% iso-butanol, about 0–0.3% iso-propanol, about 0–1% n-butanol and about 0–1% phenylethanol.

53. A product according to claim 52 wherein said flavoring agent consists essentially of about 3—13% linalool, about 2% linalool oxide, about 5% trans-2-hexenal, about 2% 1-penten-3-ol, about 0.7–8% trans-2-hexen-1-ol, about 2–5% cis-3-hexen-1-ol, about 3—21% iso-butanal, about 5–25% 2-methylbutanal, about 0–17% propanal, about 3–7% pentanal, about 1–6% hexanal, about 6–46% acetaldehyde, about 1–16% phenylacetaldehyde, about 0–2% methyl salicylate, about 1% n-hexanol, about 0–0.03% beya-ionone, about 0–0.05% iso-jasmone, about 0–0.4% benzaldehyde, about 0.1–2% n-pentanol, about 0.02–1% n-octanol, about ½% geraniol, about 0–3% iso-butanol, about 0–0.3% iso-propanol, about 0–1% n-butanol and about 0–1% phenylethanol.

54. A product according to claim 52 wherein said flavoring agent consists essentially of about 56% linalool, about 12% linalool oxide, about 11% trans-2-hexen-1-ol, about 15% isobutanal, about 5% methyl salicylae, about 1% n-hexanol and about ½% geraniol.

55. A soluble tea including an amount of a flavoring agent sufficient to enhance the flavor of a final tea beverage, said flavoring agent consisting essentially of about 5–68% of at least one compound selected from the group consisting of linalool and linalool oxide, about 0–15% trans-2-hexenal, about 0–11% 1-penten-3-ol, about 0–8% trans-2-hexen-1-ol, about 2–16% cis-3-hexen-1-ol, about 0–21% iso-butanal, about 0–25% 2-methylbutanal, about 0–17% propanal, about 0–10% pentanl, about 0–6% hexanal, about 0–46% acetaldehyde, about 0–16% phenylacetaldehyde, about 0–5% methyl salicylate, about 0–4% n-hexanol, about 0–2% ethyl acetate, about 0–0.6% alpha-terpineol, about 0–0.6% nerolidol, about 0–0.3% beta-ionone, about 0–0.3% iso-jasmmone, about 0–0.7% benzaldehyde, about 0–2% n-pentanol, about 0–1% n-octanol, about 0–0.7% geraniol, about 0– 3% iso-butanol, about 0–0.3% iso-propanol, about 0–8% n-butanol, about 0–1% phenylethanol, about 0–5% propionic acid, about 0–1% iso-butyric acid, about 0–1.2% n-butyric acid, about 0–4% iso-valeric acid, about 0–4% n-valeric acid, about 0–0.6% 2-methylvaleric acid, about 0–0.06% iso-hexanoic acid, about 0–19% n-hexanoic acid, about 0–10% cis-3-hexenoic acid, about 0–10% trans-2-hexenoic acid and about 0–4% cis-2-penten-1-ol.

56. A product according to claim 55 wherein said flavoring agent is added in an amount to product a final tea beverage having therein an added flavoring agent in an amount of about 0.01–25 ppm.

57. A product according to claim 55 wherein said flavoring agent is added in an amount to produce a final tea beverage having therein an added flavoring agent in an amount of about 0.1–5 ppm.

58. A product according to claim 55 wherein said soluble tea is dried and said flavoring agent is added to said soluble tea prior to said drying.

59. A product according to claim 55 wherein said soluble tea is dried and said flavoring agent is added to said soluble tea after drying.

60. A product according to claim 55 wherein said flavoring agent includes at least about 0.7% n-hexanol.

61. A product according to claim 55 wherein said flavoring agent consists essentially of about 5–68% of at least one compound selected from a group consisting of linalool and linalool oxide, about 0–15% trans-2-hexenal, about 1–11% 1-penten-3-ol, about 0–8% trans-2-hexen-1-ol, about 2–16% cis-3-hexen-1-ol, about 0–21% iso-butanal, about 0–25% 2-methylbutanal, about 0–17% propanal, about 0–10% pentanal, about 0–6% hexanal, about 0–46% acetaldehyde, about 0–16% phenylacetaldehyde, about 0–5% methyl salicylate, about 0–4% n-hexanol, about 0–2% ethyl acetate, about 0–0.6% alpha-terpineol, about 0–0.6% nerolidol, about 0–0.3% beta-ionone, about 0–0.3% iso-jasmone, about 0–0.4% benzaldehyde, about 0–2% n-pentanol, about 0–1% n-octanol, about 0.4–0.7% geraniol, about 0–3% iso-butanol, about 0–0.3% iso-propanol, about 0–1% n-butanol and about 0–1% phenylethanol.

62. A product according to claim 61 wherein said flavoring agent includes about 3–56% linalool and about 2–16% linalool oxide.

63. A product according to claim 61 wherein said soluble tea is a cold-water soluble tea and said flavoring agent consists essentially of about 18–27% linalool, about 10–16% linalool oxide, about 7–15% trans-2-hexenal, about 4–8% 1-penten-3-ol, about 2–4% trans-2-hexen-1-ol, about 5–9% cis-3-hexen-1-ol, about 1–4% isobutanal, about 1–5% 2-methylbutanal, about 1-3% propanal, about 6-10% pentanal, about 1-3% hexanal, about 8-17% acetaldehyde, about ½-1.2% phenylacetaldehyde, about 1-4% methyl salicylate, about 2-4% n-hexanol, about 0.2-2% ethyl acetate, about 0.4-0.6% alpha-terpineol, about 0.3-0.6% nerolidol, about 0.1-0.3% betaionone and about 0.1-0.3% iso-jasmone.

64. A product according to claim 61 wherein said soluble tea is a cold-water soluble tea and said flavoring agent consists essentially of about 18-27% linalool, about 10-16% linalool oxide, about 7-15% trans-2-hexenal, about 4-8% 1-penten-3-ol, about 2-4% trans-2-hexen-1-ol, about 5-9% cis-3-hexen-1-ol, about 1-4% isobutanal, about 1-5% 2-methylbutanal, about 1-3% propanal, about 6-10% pentanal, about 1-3% hexanal, about 8-17% acetaldehyde, about ½-1.2% phenylacetaldehyde, about 1-4% methyl salicylate, about 2-4% n-hexanol, about 0.2-2% ethyl acetate, about ½% alpha-terpineol, about ½% nerolidol, about 0.2% beta-ionone and about 0.2% iso-jasmone.

65. A product according to claim 61 wherein said soluble tea is a cold-water soluble tea and said flavoring agent consists essentially of about 29-43% of at least one member selected from the group consisting of linalool and linalool oxide, about 7-15% trans-2-hexenal, about 4-8% 1-penten-3-ol, about 2-4% trans-2-hexen-1-ol, about 5-9% cis-3-hexen-1-ol, about 1-4% iso-butanal, about 1-5% 2-methylbutanal, about 1-3% propanal, about 6-10% pentanal, about 1-3% hexanal, about 8-17% acetaldehyde, about ½-1.2% phenylacetaldehyde, about 1-4% methyl salicylate, about 2-4% n-hexanol, about 0.2-2% ethyl acetate, about 0.4-0.6% alphaterpineol, about 0.3-0.6% nerolidol, about 0.1-0.3% beta-ionone and about 0.1-0.3% iso-jasmone.

66. A product according to claim 55 wherein said soluble tea is a hot-water soluble tea and said flavoring agent consists essentially of about 5-68% of at least one member selected from the group consisting of linalool and linalool oxide, about 0-7% trans-2-hexenal, about 0-11% 1-penten-3-ol, about 0-8% trans-2-hexen-1-ol, about 2-16% cis-3-hexen-1-ol, about 0-21% iso-butanal, about 0-25% 2-methylbutanal, about 0-17% propanal, about 0-7% pentanal, about 0-6% hexanal, about 0-46% acetaldehyde, about 0-16% phenylacetaldehyde, about 0-5% methyl salicylate, about 0.7-1 ½% n-hexanol, about 0-0.03% beta-ionone, about 0-0.05% iso-jasmone, about 0-0.7% benzaldehyde, about 0-2% n-pentanol, about 0-1% n-octanol, about 0-0.7% geraniol, about 0-3% isobutanol, about 0-0.3% iso-propanol, about 0-8% n-butanol, about 0-1% phenylethanol, about 0-5% propionic acid, about 0-1% isobutyric acid, about 0-1.2% n-butyric acid, about 0-4% iso-valeric acid, about 0-4% n-valeric acid, about 0-0.6% 2-methylvaleric acid, about 0-0.06% iso-hexanoic acid, about 0-19% n-hexanoic acid, about 0-10% cis-3-hexenoic acid, about 0-10% trans-2-hexenoic acid and about 0-4% cis-2-penten-1-ol.

67. A product according to claim 66 wherein said flavoring agent consists essentially of about 11% linalool, about 5% linalool oxide, about 2% trans-2-hexen-1-ol, about 6% cis-3-hexen-1-ol, about 5% hexanal, about 3% phenylacetaldehyde, about 3% methyl salicylate, about 0.8% n-hexanol, about 0.7% benzaldehyde, about 2% n-pentanol, about 8% n-butanol, about 5% propionic acid, about 0.8% iso-butyric acid, about 1% n-butyric acid, about 4% iso-valeric acid, about 4% n-valeric acid, about 0.6% 2-methyl-valeric acid, about 0.06% iso-hexanoic acid, about 19% n-hexanoic acid, about 10% cis-3-hexenoic acid, about 10% trans-2-hexenoic acid and about 3% cis-2-penten-1-ol.

68. A product according to claim 66 wherein said flavoring agent consists essentially of about 5-68% of at least one member selected from the group consisting of linalool and linalool oxide, about 0-7% trans-2-hexenal, about 1-11% 1-penten-3-ol, about 0-8% trans-2-hexen-1-ol, about 2-16% cis-3-hexen-1-ol, about 0-21% iso-butanal, about 0-25% 2-methylbutanal, about 0-17% propanal, about 0-7% pentanal, about 0-6% hexanal, about 0-46% acetaldehyde, about 0-16% phenylacetaldehyde, about 0-5% methyl salicylate, about 0.7-1 ½% n-hexanol, about 0-0.03% beta-ionone, about 0-0.05% iso-jasmone, about 0-0.4% benzaldehyde, about 0-2% n-pentanol, about 0-1% n-octanol, about 0.4-0.7% geraniol, about 0-3% iso-butanol, about 0-0.3% iso-propanol, about 0-1% n-butanol and about 0-1% phenylethanol.

69. A product according to claim 68 wherein said flavoring agent includes about 3-56% linalool and about 2-12% linalool oxide.

70. A product according to claim 68 wherein said flavoring agent consists essentially of about 3-13% linalool, about 2-3% linalool oxide, about 3-7% trans-2-hexenal, about 1-3% 1-penten-3-ol, about 0.7-8% trans-2-hexen-1-ol, about 2-5% cis-3-hexen-1-ol, about 3-21% iso-butanal, about 5-25% 2-methylbutanal, about 0-17% propanal, about 3-7% pentanal, about 0.9-6% hexanal, about 6-46% acetaldehyde, about 1-16% phenylacetaldehyde, about 0-2% methyl salicylate, about 0.7-1 ½% n-hexanol, about 0-0.03% beta-ionone, about 0-0.05% iso-jasmone, about 0-0.4% benzaldehyde, about 0.09-2% n-pentanol, about 0.02-1% n-octanol, about 0.4-0.7% geraniol, about 0-3% iso-butanal, about 0-0.3% iso-propanol, about 0-1% n-butanol and about 0-1% phenylethanol.

71. A product according to claim 55 wherein said soluble tea is a hot-water soluble tea and said flavoring agent consists essentially of about 3-56% linalool, about 2-12% linalool oxide, about 0-7% trans-2-hexenal, about 0-11% 1-penten-3-ol, about 0-8% trans-2-hexen-1-ol, about 2-16% cis-3-hexen-1-ol, about 0-21% isobutanal, about 0-25% 2-methylbutanal, about 0-17% propanal, about 0-7% pentanal, about 0-6% hexanal, about 0-46% acetaldehyde, about 0-16% phenylacetaldehyde, about 0-5% methyl salicylate, about 1% n-hexanol, about 0-0.03% beta-ionone, about 0-0.05% iso-jasmone, about 0-0.7% benzaldehyde, about 0-2% n-pentanol, about 0-1% n-octanol, about 0-0.7% geraniol, about 0-3% iso-butanol, about 0-0.3% iso-propanol, about 0-8% n-butanol, about 0-1% phenylethanol, about 0-5% propionic acid, about 0-1% iso-butyric acid, about 0-1.2% n-butyric acid, about 0-4% iso-valeric acid, about 0-4% n-valeric acid, about 0-0.6% 2-methylvaleric acid, about 0-0.06% iso-hexanoic acid, about 0-19% n-hexanoic acid, about 0-10% cis-3-hexenoic acid, about 0-10% trans-2-hexenoic acid and about 0-4% cis-2-penten-1-ol.

72. A product according to claim 71 wherein said flavoring agent consists essentially of about 3-56% linalool, about 2-12% linalool oxide, about 0-7% trans-2-hexenal, about 1-11% 1-penten-3-ol, about 0-8% trans-2-hexen-1-ol, about 2-16% cis-3-hexen-1-ol, about 0-21% iso-butanal, about 0-25% 2-methylbutanal, about 0-17% propanal, about 0-7% pentanal, about 0-6% hexanal, about 0-46% acetaldehyde, about 0–16% phenylacetaldehyde, about 0–5% methyl salicylate, about 1% n-hexanol, about 0–0.03% beta-ionone, about 0–0.05% iso-jasmone, about 0–0.4% benzaldehyde, about 0–2% n-pentanol, about 0–1% n-octanol, about ½% geraniol, about 0–3% iso-butanol, about 0–0.3% iso-propanol, about 0–1% n-butanol and about 0–1% phenylethanol.

73. A product according to claim 72 wherein said flavoring agent consists essentially of about 3–13% linalool, about 2% linalool oxide, about 5% trans-2-hexenal, about 2% 1-penten-3-ol, about 0.7–8% trans-2-hexen-1-ol, about 2–5% cis-3-hexen-1-ol, about 3–21% iso-butanal, about 5–25% 2-methylbutanal, about 0–17% propanal, about 3–7% pentanal, about 1–6% hexanal, about 6–46% acetaldehyde, about 1–16% phenylacetaldehyde, about 0–2% methyl salicylate, about 1% n-hexanol, about 0–0.03% beta-ionone, about 0–0.05% iso-jasmone, about 0–0.4% benzaldehyde, about 0.1–2% n-pentanol, about 0.02–1% n-octanol, about ½% geraniol, about 0–3% iso-butanol, about 0–0.3% iso-propanol, about 0–1% n-butanol and about 0–1% phenylethanol.

74. A product according to claim 72 wherein said flavoring agent consists essentially of about 56% linalool, about 12% linalool oxide, about 11% trans-2-hexen-1-ol, about 15% isobutanal, about 5% methyl salicylate, about 1% n-hexanol and about ½% geraniol.

* * * * *